O. WERNER.
VALVE OPERATING SYSTEM FOR COMBUSTION ENGINES.
APPLICATION FILED MAR. 19, 1918.
1,377,297.
Patented May 10, 1921.
3 SHEETS—SHEET 1.
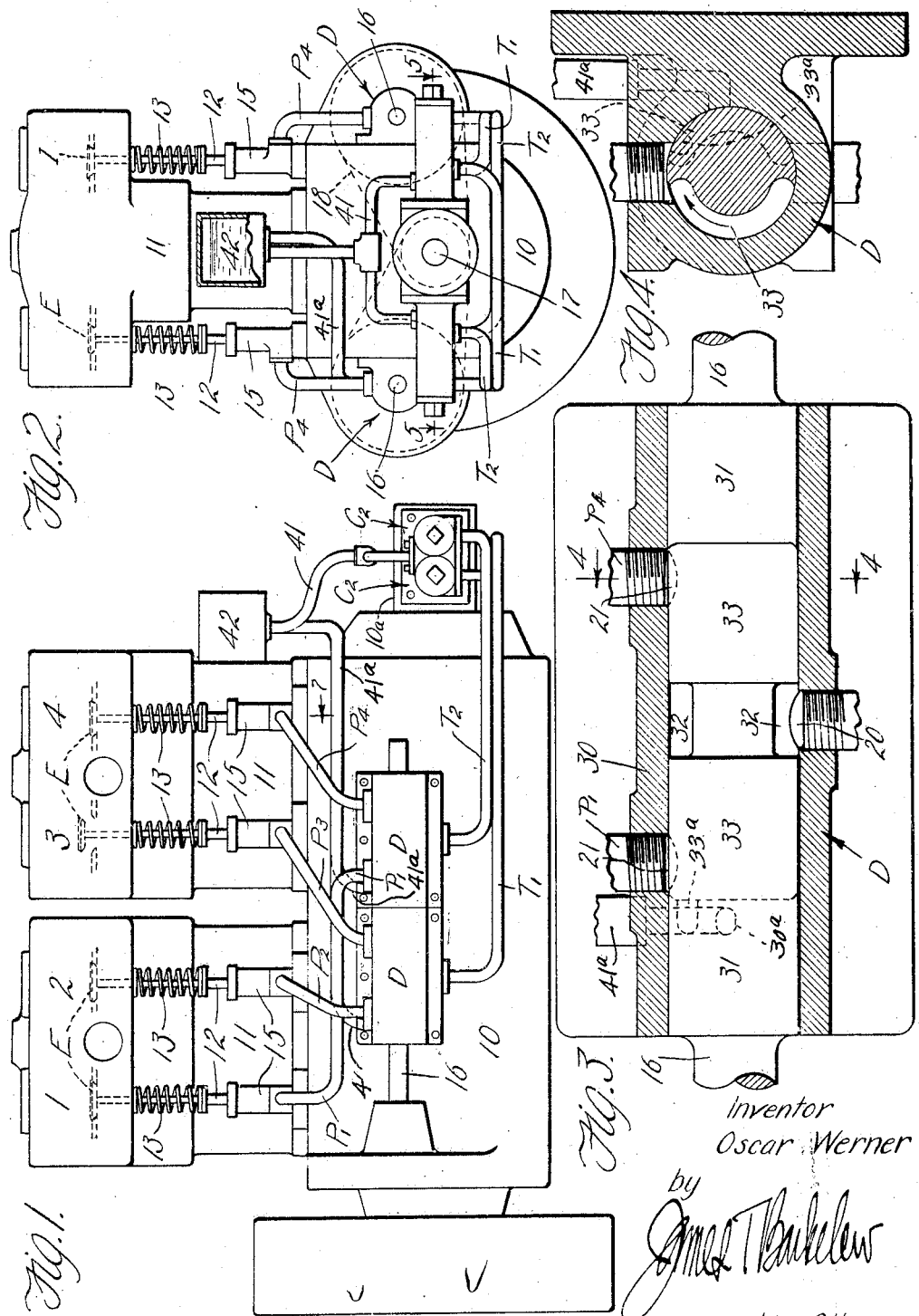
Inventor
Oscar Werner
by
James T. Barkelew
his Attorney

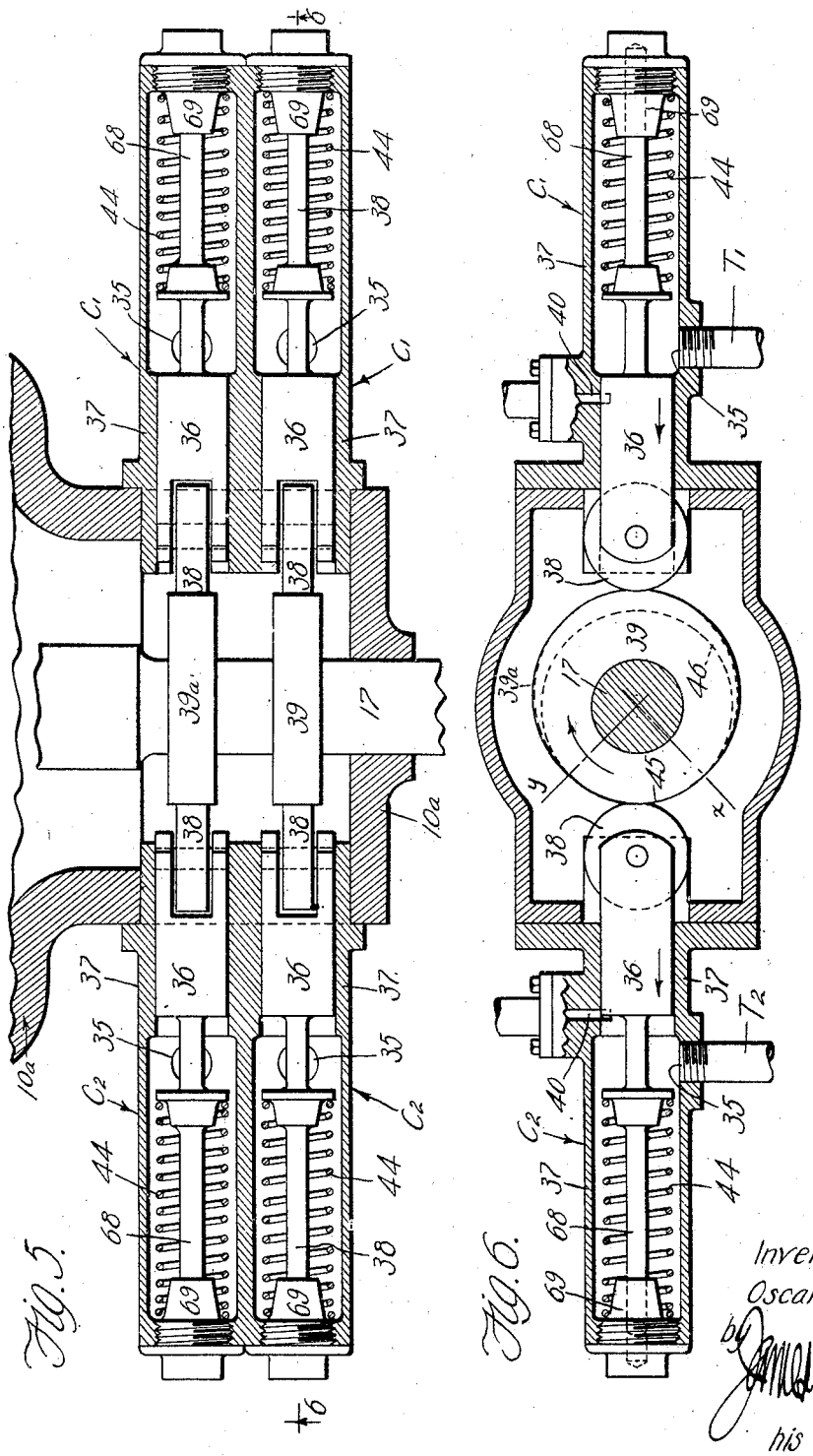

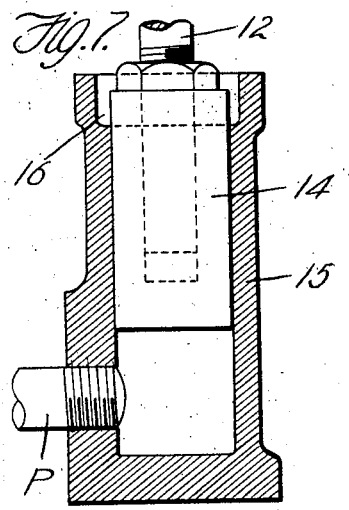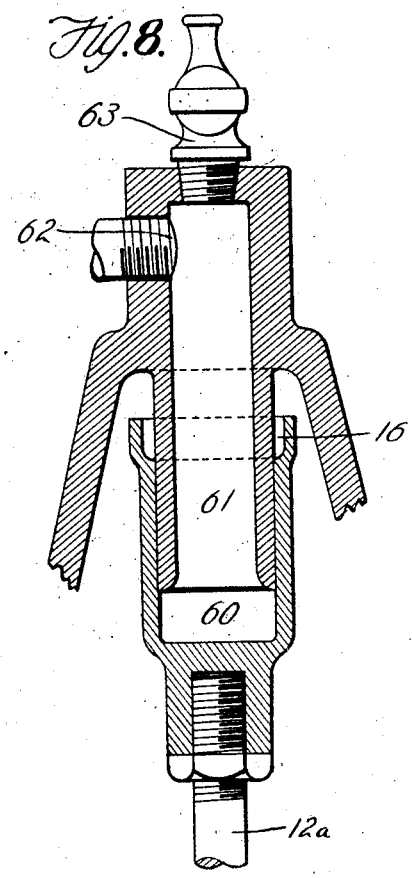

UNITED STATES PATENT OFFICE.

OSCAR WERNER, OF LOS ANGELES, CALIFORNIA.

VALVE-OPERATING SYSTEM FOR COMBUSTION-ENGINES.

1,377,297.  Specification of Letters Patent.  Patented May 10, 1921.

Application filed March 19, 1918. Serial No. 223,423.

*To all whom it may concern:*

Be it known that I, OSCAR WERNER, citizen of the United States, residing at Los Angeles, in the county of Los Angeles, State of California, have invented new and useful Improvements in Valve-Operating Systems for Combustion-Engines, of which the following is a specification.

This invention relates to systems of valve operations for internal combustion engines, or for any other mechanism (such as other engines, various classes of pumps); and refers to these devices in a general way, and, broadly, without reference to the particular kind of valves employed. However, in actual practical use, my invention relates more specifically, (although not limited thereto) to internal combustion or other heat engines using the puppet style of valve; and the following description sets forth the general utilities and advantages and features of my invention, and the specific advantages as applied to such an engine.

In such engines as are now in common use on automobiles, etc., there are several difficulties attendant the operation of puppet valves. These valves are usually operated from a cam shaft which, in the case of a four-cycle engine, is driven at half speed by gearing or chain connection from the crank shaft. The valves are seated by strong springs which serve to keep the valve stem or the tappet in contact with the cam. During the period of time when the valve is lifted, the cam is expending energy upon the valve—the valve spring has a tendency to retard rotation of the cam. During the time period when the valve is descending the valve spring tends to make the cam move forwardly. Thus there is an alternating back and forth pressure upon the cam which causes noise and wear in the driving mechanism of the cam shaft.

Furthermore, there is always a difficulty arising from the necessity of having clearance at some place between the cam and the valve stem.

In motors of the character described it is necessary to have this clearance in order to insure seating of the valve. As the motor varies in temperature the valve stems lengthen and shorten; and it is necessary to have sufficient clearance to accommodate such expansion and contraction of the parts in order to insure that the valve shall always seat. Consequently as the cam comes into contact with the valve stem, there is always a certain amount of noise and also wear. It is the practice in such engines to keep that clearance as small as possible; but with a small clearance there is always a liability that the valve may not properly seat. And whenever the valves are ground or whenever they wear somewhat, it is necessary to make adjustment of the clearance.

Furthermore, this clearance being varied by varying temperature of the motor, there necessarily results a variable operation of the valves.

It is the object and purpose of this invention to overcome and remedy all of these defects; both as applied particularly to an engine of the type described and also as applied generally to any machinery wherein it is desired to accurately and positively operate the valves. The nature of the invention and the features thereof which accomplish these objects will be best understood from the following detailed description of a preferred and specific form of device applied to a specific form of internal combustion engine. However, before proceeding with such detailed description I may state that my invention involves more generally the provision of means between the actuating cam or cams and the valve or valves, automatically compensating for any variations due to expansion and contraction for wear or for any adjustment of the valves, etc. And, more specifically, my invention takes the form of devices arranged so that the actuating cam or cams may be mounted directly upon the crank shaft of the engine, and may be so designed as to do away with the alternating back and forth pressure herein referred to; and so that the cam "follower" may always keep in contact with the cam. In accomplishing my objects and in providing the mechanism herein referred to, I preferably use a non-compressible liquid medium for transmitting energy and movement from the cam to the valve; using in a four-cycle engine a distributing valve between the cam and the engine valves; which distributing valve may be operated, in a four-cycle engine, at half time speed from the crank shaft. However, this distributing valve may be so designed that the torque is steady.

I now refer more particularly to the accompanying drawings. Figure 1 is a side elevation of an internal combustion engine equipped with my invention; Fig. 2 is a front end elevation of the same; Fig. 3 is an enlarged longitudinal section of one of the distributing valves; Fig. 4 is a cross-section taken on line 4—4 of Fig. 3; Fig. 5 is an enlarged horizontal longitudinal section taken on line 5—5 of Fig. 2; Fig. 6 is a section taken on line 6—6 of Fig. 5; Fig. 7 is an enlarged section on line 7 of Fig. 1; and Fig. 8 is a section showing a modified form of the mechanism shown in Fig. 7, adapted for overhead valve construction.

In the drawings the numeral 10 designates the crank case of any typical engine and 11 designates the cylinder castings thereof. This engine may be of any ordinary type, and is illustrated as of T-head type with exhaust and inlet valves on opposite sides. These exhaust and inlet valves E and I may be of the ordinary type, mounted upon valve stems 12 and seated by the action of springs 13. In my preferred construction each valve stem carries on its lower end (see Fig. 7) a piston or plunger 14 adapted to work in a small cylinder 15 to the lower part of which liquid under pressure is admitted and withdrawn through a pipe P. The valve stem is adjustably connected to the piston or plunger 14; and means are provided at 16 for catching any liquid leakage which makes its way by the plunger. The pipes $P^1$, $P^2$, $P^3$ and $P^4$ lead from the cylinders 15 to the distributing valves D. These valves D are of simple design and construction, preferably rotary valves, mounted directly upon the half-time shaft 16 which is connected by any suitable gearing to the crank shaft 17 of the engine so as to run at half crank shaft speed. For instance, I may use a chain drive as is indicated at 18 in Fig. 2. Each of the distributing valves D has a single inlet port 20 and two outlet ports 21 to which the pipes $P^1$, $P^2$, $P^3$, $P^4$ connect. One of the distributing valves distributes pressure to the pipes $P^1$ and $P^4$, while the other distributes pressure to the pipes $P^2$ and $P^3$. The pump mechanism hereinafter described sends an impulse of liquid pressure through the transmission pipe T, to port 20 of the distributing valve, once for every revolution of the engine crank shaft. Each valve only needs to be raised once every two revolutions of the crank shaft, and as the pistons of cylinders 1 and 4 are usually arranged to travel up and down with each other, and oppositely to the piston in cylinders 2 and 3; I accordingly make the distributing valves simply divert the pressure impulse which comes through the pipe T alternately to the cylinders 15 of the valves of either the cylinders 1 and 5 or of cylinders 2 and 3. The valves D preferably comprise casings or cylinders 30 in which are the ports 20 and 21, and a rotary member 31 having therein a central annular channel 32 registering at all times with port 20 and having also lateral surface depressions 33 connecting with this channel 32 and adapted each to register with one of the ports 21 during approximately a half revolution of the rotary member 31 and of the half-time shaft 16, and during approximately a whole revolution of the crank shaft.

The two pressure transmission pipes $T^1$ and $T^2$ lead back to the two fluid compressing mechanisms $C^1$ and $C^2$, connecting into those mechanisms at ports 35. Each fluid compression mechanism comprises preferably a piston or plunger 36 operating in a cylinder 37 and carrying a roller 38 which contacts and rides directly upon the cam 39 or $39^a$ on crank shaft 17 of the engine. Cam 39 is the exhaust cam while cam $39^a$ is the inlet cam. The liquid compression mechanisms $C^1$ and $C^2$ which are operated by inlet cam $39^a$ have their pipes $T^1$ and $T^2$ connected into the distributing valves D at the right hand side in Fig. 2, and these distributing valves distribute the liquid pressure to the cylinders 15 which cause the operation of the inlet valves I; whereas the mechanisms $C^1$ and $C^2$ which are operated by exhaust cam 39 are connected by their pipes $T^1$ and $T^2$ to the distributing valves D shown at the left in Fig. 2, which distributing valves send the liquid pressure to the cylinders 15 at the left in Fig. 2, which cause the operation of the exhaust valves E shown at the left in Fig. 2. The cylinders 37 of the four mechanisms $C^1$ and $C^2$ may be very conveniently mounted upon an extension $10^a$ of the crank case 10.

Each plunger 36 has on its inner end a plunger stem 68 which operates in a plug 69 closing the end of the cylinder, which forms a guide. A spring 44 presses the plunger 36 toward its cam and keeps the roller 38 always in engagement with the cam.

Consider now first the operation of the exhaust mechanisms which are actuated by the cam 39. The plunger 36 at the left in Fig. 6 is shown at its point of travel farthest to the right; in the position just ready to begin movement to the left to compress liquid in the cylinder 37. The other plunger 36 in this figure is shown in its position farthest to the right, having effected its compression of liquid within its cylinder 37 and being now ready to begin its backward motion toward the left to relieve that pressure. When the plunger is in the position shown at the left in Fig. 6 its end just uncovers a port 40 through which liquid flows back and forth in order to equalize changes and variations in volume caused either by expansion or contraction of the valve stems 12 or other parts or leakage of the fluid. These ports 40 are connected by piping 41 with a small tank 42 holding a small amount of the liquid (which may be water, oil, glycerin, etc.) and the liquid being preferably open to atmospheric pressure. This tank 42 is high enough that liquid will always flow from it through the open port 40 into the pressure system to supply any deficiency or take up any excess of liquid. When a plunger is in the position shown at the left in Fig. 6, then, the port 40 being uncovered, liquid may either flow in or out to compensate for any variation which may have taken place, and to keep the liquid system at all times entirely full of liquid (any air which may get into the system will leak out at the highest point past the plunger 14.) This liquid equalizing system could very advantageously be operated by the half time shaft by providing ports 33ª in the valve 31 so arranged as to register with suitable ports 30ª in valve chest 30, said ports being connected by pipes 41ª to the reservoir 42. As the cam 39 revolves, it begins to move the plunger 36 in the direction indicated. When the cam has rotated so that the line indicated at X has come directly beneath the roller 38, then the plunger 36 has just covered the port 40 and further motion of the plunger will then compress the liquid in the cylinder 37, the previous motion having had the effect of forcing the surplus liquid out through the port 40. The cam, owing to its shape, then continues to force the plunger 36 outwardly to the limit of its movement and then allows it to move back toward the position shown in Fig. 6; and just as the end of the plunger again reaches the edge of port 40 and begins to again uncover the port 40, the line indicated at Y on the cam 39 has reached the roller 38. As the cam keeps on rotating, the plunger recedes so as to uncover the port 40 and the port 40 is not again covered until the line X reaches the roller 38. In other words, the part of the cam surface denoted 45 and lying between the lines X and Y is below what is called the base circle of the cam which is indicated at 46. The positions of the lines X and Y (that is, the positions at which the contour of the cams cross the base circle 46) determine the part of the cam revolution during which the plunger is compressing liquid in the cylinder 37. This compressed liquid is sent to one or the other of the valves, thereby raising that valve; and it will be thus observed that the time period during which the valve will be raised depends entirely upon the design and contour of the actuating cam. (The distributing valves do nothing but merely distribute the liquid pressure between the several inlet or exhaust valves; they have nothing to do with the timing of the liquid pressure impulse). It will thus be seen that there is a period of time during which the plunger 36 is compressing the liquid and causing the operation of a valve and a period in which the pressure is relieved and the valve allowed to seat, and an equalizing flow of liquid is allowed to take place. This equalizing flow of liquid takes place once for every operation of the plunger; with the result that the cylinders and liquid passages, etc., are at all times full of liquid under a certain unvarying pressure, said pressure being determined by the position of the reservoir 42, and being negligible as compared to the pressure exerted by springs 13 in Figs. 1 and 2. The inlet mechanism operates in exactly the same manner as described for the exhaust mechanism; excepting that the inlet cam 39ª is somewhat differently shaped, and in a different position than exhaust cam 39, the inlet valves being held open through a smaller period than are the exhaust valves, and their opening and closing is timed differently.

It will be seen that the cam followers are at all times in engagement with the cams; so that there is no shock of contact between the cams and the cam followers. These cams may be so designed, and have such easy grades of rise and fall, that there is no tendency, or very little tendency, for the parts which are actuated by the cams, having the effect of urging the cams forward or holding them rearward to any detrimental extent. Furthermore, the cams are directly mounted upon the crank shaft without the intervention of any gearing.

In Fig. 8 I show a form of device adapted particularly to overhead valves. In this figure the numeral 12ª designates the valve stem which is connected to the bottom of a cylinder 60 which telescopes over the cylinder 61. This construction affords opportunity to use the means shown at 16 for holding any small leakage past the cylinder 61. This construction affords opportunity to use the means shown at 16 for holding any small leakage past the cylinder 61. The pressure pipes connect at the port 62; and at the top of the cylinder 61 I provide a relief cock 63 through which any air accumulation may be relieved.

It is believed that from the foregoing description the general nature of my invention will be readily understood. I have gone into some specific detail in explaining preferred forms of my device, not for the purpose of limiting myself to the particular forms so explained, but for the purpose of giving a clear practical idea of my invention. Accordingly, I reserve to myself all such modifications and changes as may suggest themselves to those skilled in the art, or such as may fall within the scope of the following claims.

Having described a preferred form of my invention, I claim:

1. Valve actuating mechanism for a multiple valved engine, embodying a single cylinder and plunger mechanism actuated by the engine in timed relation thereto and adapted to periodically raise a pressure on a non-compressible fluid in accurately timed relation to the operation periods of the engine, plungers connected with the several valves of the engine and adapted to be moved by the fluid pressure thus raised; and a distributing valve between the pressure raising mechanism and the valve plungers adapted to distribute to the several valve plungers the accurately timed successive pressure impulses raised by the periodic action of the pressure raising mechanism.

2. Valve actuating mechanism for a multiple valved engine, embodying a single cylinder and plunger mechanism actuated by the engine and adapted to periodically raise a pressure on a fluid, plungers connected with the several valves of the engine adapted to be moved by the fluid pressure thus raised; a distributing valve between the pressure raising mechanism and the valve plungers and adapted to distribute the fluid pressure to the several plungers in successive relation; and means whereby the periodically compressed body of fluid is periodically connected with a supply of fluid.

3. Valve actuating mechanism for a multiple valved engine, embodying a single cylinder and plunger mechanism actuated by the engine in timed relation thereto and adapted to periodically raise a pressure on a non-compressible fluid in accurately timed relation to the operation periods of the engine, plungers connected with the several valves of the engine and adapted to be moved by the fluid pressure thus raised; a distributing valve between the pressure raising mechanism and the valve plungers adapted to distribute to the several valve plungers the accurately timed successive pressure impulses raised by the periodic action of the pressure raising mechanism; and means whereby the periodically compressed body of fluid is peridically connected with a supply of liquid.

4. Valve actuating mechanism for a multiple valved engine, embodying a single cylinder and plunger mechanism actuated by the engine and adapted to periodically raise a pressure on a fluid, plungers connected with the several valves of the engine adapted to be moved by the fluid pressure thus raised; a distributing valve between the pressure raising mechanism and the valve plungers and adapted to distribute the fluid pressure to the several plungers in successive relation; and means in conjunction with the distributing valve whereby the peridically compressed body of fluid is periodically connected with a supply of fluid.

In witness that I claim the foregoing I have hereunto subscribed my name this 8th day of March, 1918.

OSCAR WERNER.

Witness:
 VIRGINIA I. BERINGER.